(12) United States Patent
Hsu (10) Patent No.: US 10,866,736 B2
(45) Date of Patent: *Dec. 15, 2020

(54) MEMORY CONTROLLER AND DATA PROCESSING CIRCUIT WITH IMPROVED SYSTEM EFFICIENCY

(71) Applicant: Silicon Motion, Inc., Jhubei (TW)

(72) Inventor: Tzu-Wei Hsu, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,419

(22) Filed: Jun. 19, 2019

(65) Prior Publication Data

US 2019/0303016 A1    Oct. 3, 2019

Related U.S. Application Data

(63) Continuation of application No. 15/868,535, filed on Jan. 11, 2018, now Pat. No. 10,372,338.

(30) Foreign Application Priority Data

Apr. 13, 2017    (TW) .............................. 106112347 A (51) Int. Cl.
*G06F 3/06* (2006.01)
*G06F 13/16* (2006.01)
*G06F 13/28* (2006.01)

(52) U.S. Cl.
CPC ............ *G06F 3/0608* (2013.01); *G06F 3/065* (2013.01); *G06F 3/0679* (2013.01);
(Continued)

(58) Field of Classification Search
None
See application file for complete search history.

(56) References Cited

U.S. PATENT DOCUMENTS 5,584,010 A * 12/1996 Kawai ..................... G06F 13/28
710/107
6,725,337 B1    4/2004 Tan et al.
(Continued)

FOREIGN PATENT DOCUMENTS

CN    1193393 A    9/1998
CN    104919439 A    9/2015
(Continued)

*Primary Examiner* — Michael Sun
(74) *Attorney, Agent, or Firm* — Winston Hsu (57) ABSTRACT

A memory controller and data storage device include a central processing unit, an interface logic circuit and an arbiter circuit. The central processing unit includes an internal memory device. The interface logic circuit is coupled to an external memory device and a standard bus. The arbiter circuit is directly coupled to the central processing unit via an SRAM bus. When the central processing unit has to read predetermined data stored in the external memory device, the central processing unit issues a first request to the interface logic circuit. In response to the first request, the interface logic circuit reads the predetermined data from the external memory device and transmits the predetermined data to the arbiter circuit via the standard bus. The arbiter circuit transfers the predetermined data directly to the central processing unit via the SRAM bus to write the predetermined data in the internal memory device.

14 Claims, 4 Drawing Sheets

(52) U.S. Cl.
CPC ...... *G06F 13/1657* (2013.01); *G06F 13/1678* (2013.01); *G06F 13/28* (2013.01)

(56) References Cited

U.S. PATENT DOCUMENTS

| | | | |
|---|---|---|---|
| 6,735,679 | B1 | 5/2004 | Herbst et al. |
| 8,281,265 | B2 | 10/2012 | Vorbach et al. |
| 8,539,152 | B2 | 9/2013 | Shaeffer et al. |
| 8,539,153 | B2 * | 9/2013 | Cho ................... G06F 12/0802 711/118 |
| 9,251,870 | B2 | 2/2016 | Dally et al. |
| 2002/0138678 | A1 * | 9/2002 | Kim ..................... G06F 13/364 710/240 |
| 2005/0240745 | A1 * | 10/2005 | Iyer .................... G06F 12/0223 711/167 |
| 2005/0268027 | A1 * | 12/2005 | Katsuki ............... G06F 13/1678 711/105 |
| 2007/0234009 | A1 | 10/2007 | Wolrich |
| 2011/0060942 | A1 * | 3/2011 | Vorbach .............. G06F 13/1663 714/6.2 |
| 2011/0302352 | A1 | 12/2011 | Lee et al. |
| 2012/0233382 | A1 | 9/2012 | Yamanaka et al. |
| 2013/0054855 | A1 * | 2/2013 | Yamashita ............ G06F 1/3253 710/110 |
| 2013/0232296 | A1 | 9/2013 | Yonezawa et al. |
| 2014/0032820 | A1 | 1/2014 | Harasawa et al. |
| 2014/0115271 | A1 | 4/2014 | Pierson et al. |
| 2014/0115272 | A1 | 4/2014 | Pierson |

FOREIGN PATENT DOCUMENTS

| | | |
|---|---|---|
| JP | 2000-47930 A | 2/2000 |
| TW | 591384 B | 6/2004 |
| TW | I566100 B | 1/2017 |

* cited by examiner

MEMORY CONTROLLER AND DATA PROCESSING CIRCUIT WITH IMPROVED SYSTEM EFFICIENCY

CROSS REFERENCE TO RELATED APPLICATIONS

This application is a Continuation of pending U.S. patent application Ser. No. 15/868,535, filed on Jan. 11, 2018, which claims priority of Taiwan Patent Application No. 106112347, filed on Apr. 13, 2017, the entirety of which is incorporated by reference herein.

BACKGROUND OF THE INVENTION

Field of the Invention

The invention relates to a data processing circuit, and more particularly to a data processing circuit capable of improving system efficiency.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access efficiency of the data storage device, a novel memory controller structure, which not only occupies less circuit area, but also greatly reduces the time required for accessing data, is provided to improve system efficiency.

BRIEF SUMMARY OF THE INVENTION

A memory controller and a data storage device are provided. An exemplary embodiment of a memory controller coupled to an external memory device and configured to control operations thereof comprises a central processing unit, an interface logic circuit and an arbiter circuit. The central processing unit comprises an internal memory device. The interface logic circuit is coupled to the external memory device and a standard bus. The arbiter circuit is coupled to the standard bus and the central processing unit. The arbiter circuit is directly coupled to the central processing unit via a static random access memory bus. When the central processing unit has to read predetermined data stored in the external memory device, the central processing unit issues a first request to the interface logic circuit, and in response to the first request, the interface logic circuit reads the predetermined data from the external memory device and transmits the predetermined data to the arbiter circuit via the standard bus, and the arbiter circuit transfers the predetermined data directly to the central processing unit via the static random access memory bus to write the predetermined data in the internal memory device.

An exemplary embodiment of a data storage device comprises a non-volatile memory device and a memory controller. The memory controller is coupled to the non-volatile memory device and configured to control operations of the non-volatile memory device. The memory controller comprises a central processing unit, an interface logic circuit and an arbiter circuit. The central processing unit comprises an internal memory device. The interface logic circuit is coupled to the non-volatile memory device and a standard bus. The arbiter circuit is coupled to the standard bus and the central processing unit. The arbiter circuit is directly coupled to the central processing unit via a static random access memory bus. When the central processing unit has to read predetermined data stored in the non-volatile memory device, the central processing unit issues a first request to the interface logic circuit, and in response to the first request, the interface logic circuit reads the predetermined data from the non-volatile memory device and transmits the predetermined data to the arbiter circuit via the standard bus, and the arbiter circuit transfers the predetermined data directly to the central processing unit via the static random access memory bus to write the predetermined data in the internal memory device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
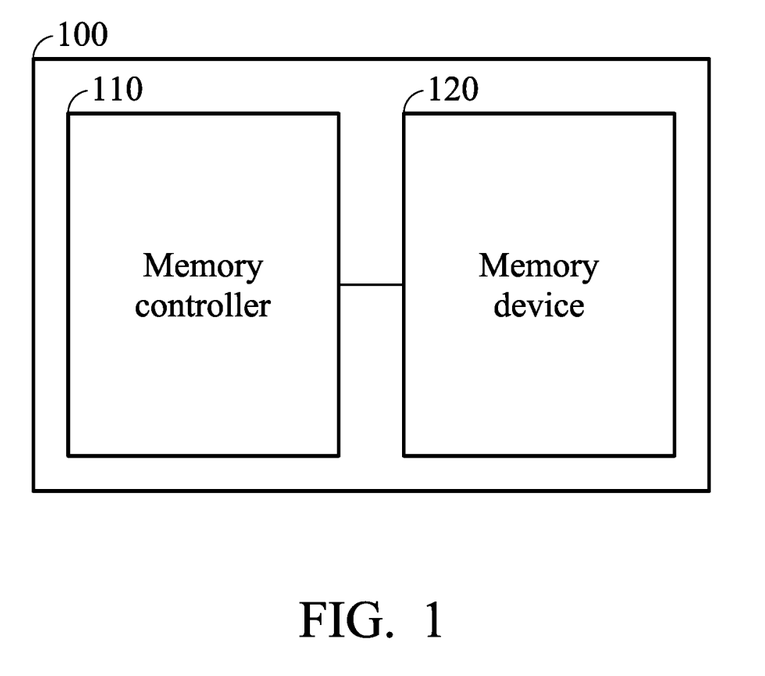
FIG. 1 is an exemplary block diagram of a data storage device according to an embodiment of the invention.

FIG. 1 is an exemplary block diagram of a data storage device according to an embodiment of the invention. The data storage device 100 may comprise a memory controller 110 and a memory device 120. The memory device 120 may be a non-volatile memory device, such as a NAND flash. The memory controller 110 is coupled to the memory device 120 and configured to control the operations of the memory device 120 and access the data stored in the memory device 120.

The data storage device 100 may be further coupled to a host device (not shown) and configured to transmit data and commands to the host device, or receive data and commands from the host device. The host device may be a mobile phone, a tablet computer, a laptop computer, a navigation device or an in-vehicle system.

Note that in order to clarify the concept of the invention, FIG. 1 presents a simplified block diagram, in which only the elements relevant to the invention are shown. However, note that the invention should not be limited what is shown in FIG. 1.

Figure 2:
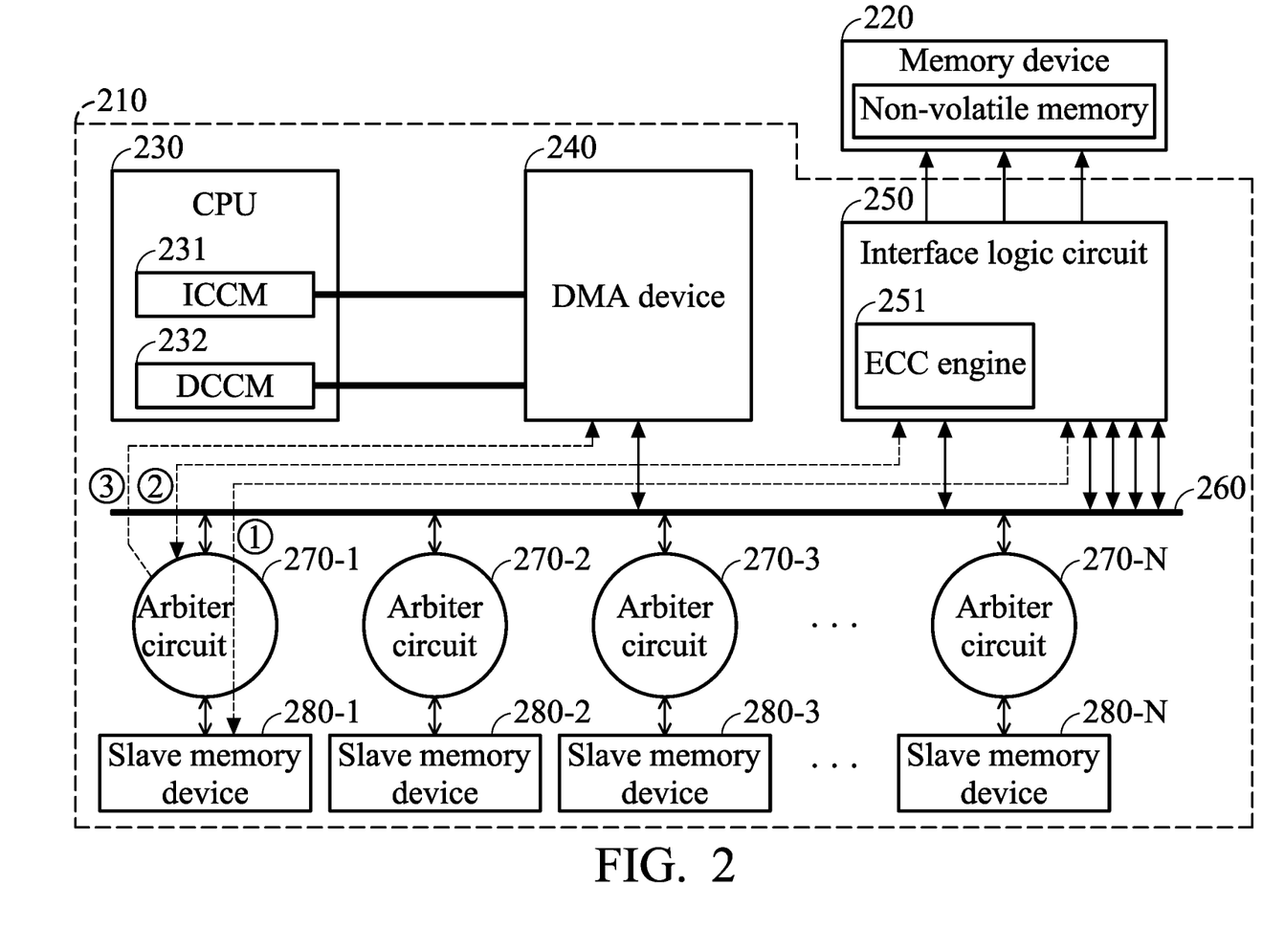
FIG. 2 shows an exemplary memory controller structure.

FIG. 2 shows an exemplary memory controller structure. The memory controller 210 may be a controller chip coupled to the external memory device 220. The memory device 220 may comprise one or more non-volatile memory devices.

The memory controller 210 may comprise a central processing unit (CPU) 230, a direct memory access (DMA) device 240, an interface logic circuit 250, a standard bus 260, a plurality of arbiter circuits 270-1, 270-2, 270-3 . . . 270-N and a plurality of slave memory devices 280-1, 280-2, 280-3 . . . 280-N, where N is a positive integer and the slave memory devices may be the volatile memory device, such as the Static Random Access Memory (SRAM).

The DMA device 240, the interface logic circuit 250 and/or any other device (not shown in FIG. 2) that would access the slave memory devices may be regarded as the master devices, and the slave memory devices 280-1, 280-2, 280-3 . . . 280-N may be regarded as the slave devices. The standard bus 260 may be configured to provide a transmission interface between the corresponding master devices and the slave devices. The arbiter circuits 270-1, 270-2, 270-3 . . . 270-N may be respectively coupled to the slave memory devices 280-1, 280-2, 280-3 . . . 280-N, and configured to perform arbitration for the corresponding slave memory device. To be more specific, the arbiter circuit may receive the requests or commands from one or more master devices via the standard bus and arbitrate the priority of multiple requests or commands, so as to determine the request or command from which master device is to be processed prior to the others when there are multiple master devices requesting to access the same slave memory device at the same time.

The CPU 230 may comprise a plurality of internal memory devices, such as the Instruction Closed Coupled Memory (ICCM) 231 and the Data Closed Coupled Memory (DCCM) 232. The ICCM and the DCCM may be the SRAM, the ICCM 231 may be configured to store program codes and the DCCM 232 may be configured to store data.

In the structure shown in FIG. 2, the DMA device 240 is configured to assist the CPU 230 to access the data stored in the memory device 220. For example, when the CPU 230 has to read data or program codes stored in the memory device 220, the CPU 230 may issue a read request or a read request command via a command interface (not shown) coupled to the interface logic circuit 250. In response to the request or command, the interface logic circuit 250 reads the data required by the CPU 230 from the memory device 22 and writes the data to the slave memory device 280-1 via the standard bus 260 as shown in the transmission path 1 shown in FIG. 2.

The interface logic circuit 250 may comprise an Error Correction Code (ECC) engine 251. When the ECC engine 251 detects that some error has occurred in the data read from the memory device 220, the ECC engine 251 reads the erroneous data to the interface logic circuit 250 for error correction, and writes the corrected data back to the slave memory device 280-1 as the transmission path 2 shown in FIG. 2.

When the transmission of the data required by the CPU 230 is completed, the interface logic circuit 250 issues an interrupt signal to notify the CPU 230 of the completeness (or, the CPU 230 may also actively poll the status of the required data). The CPU 230 then issues a request or command via a command interface (not shown) coupled to the DMA device 240. In response to this request or command, the DMA device 240 transfers the data from the slave memory device 280-1 to the internal memory, such as the ICCM 231 or DCCM 232, of the CPU 230 as the transmission path 3 shown in FIG. 2.

In the structure shown in FIG. 2, because the transmission of the data required by the CPU 230 must be performed via the DMA 240, there is a lack of efficiency. To solve this problem, and further enhance the access efficiency of the memory device, novel memory controller structures and data access methods are provided.

Figure 3:
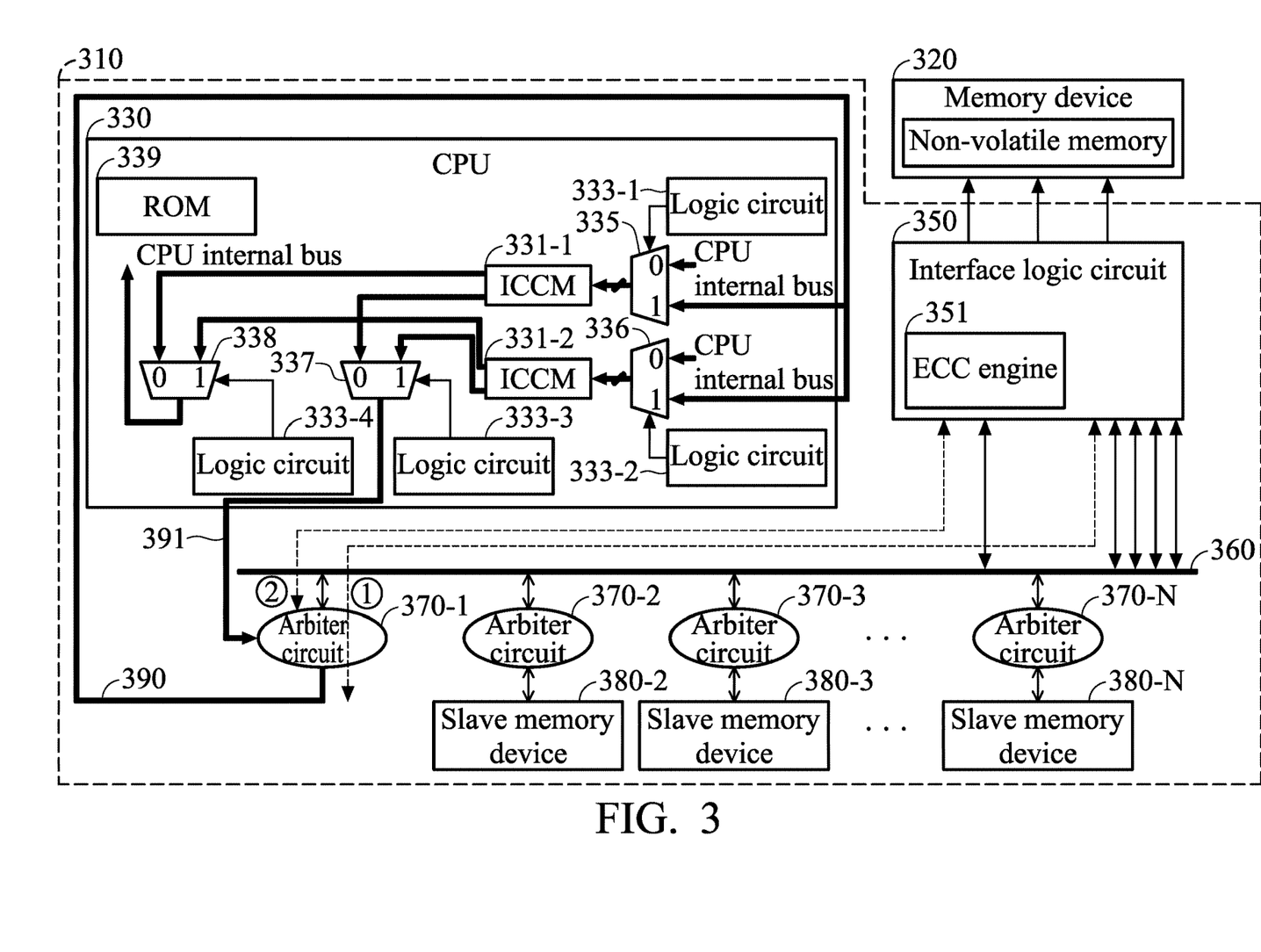
FIG. 3 is an exemplary block diagram of a memory controller according to an embodiment of the invention.

FIG. 3 is an exemplary block diagram of a memory controller according to an embodiment of the invention. The memory controller 310 may be a controller chip of the data storage device as shown in FIG. 1, and may be coupled to an external memory device 320. The memory device 320 may comprise one or more non-volatile memory devices.

The memory controller 310 may comprise a CPU 330, an interface logic circuit 350, a standard bus 360, a plurality of arbiter circuits 370-1, 370-2, 370-3 . . . 370-N and a plurality of slave memory devices 380-1, 380-2, 380-3 . . . 380-N, where N is a positive integer and the slave memory devices may be the volatile memory device, such as the SRAM.

The interface logic circuit 350 and/or any other device (not shown in FIG. 3) that would access the slave memory devices may be regarded as the master devices, and the slave memory devices 380-1, 380-2, 380-3 . . . 380-N may be regarded as the slave devices. The standard bus 360 may be configured to provide a transmission interface between the corresponding master devices and the slave devices. The arbiter circuits 370-1, 370-2, 370-3 . . . 370-N may be respectively coupled to the slave memory devices 380-1, 380-2, 380-3 . . . 380-N, and configured to perform arbitration for the corresponding slave memory device. To be more specific, the arbiter circuit may receive the requests or commands from one or more master device via the standard bus 360 and arbitrate the priority of multiple requests or commands, so as to determine the requestor command from which master device is to be processed prior to the others when there are multiple master devices requesting to access the same slave memory device at the same time.

The CPU 330 may comprise a plurality of internal memory devices, such as the ICCM 331-1 and 331-2 configured to store program codes, the DCCM (not shown in FIG. 3 for brevity, but shown in FIG. 4) configured to store data and the read only memory (ROM) 339. The ICCM and the DCCM may be the SRAM.

In the structure shown in FIG. 3, the CPU 330 does not comprise the DMA device. According to an embodiment of the invention, the arbiter circuit 370-1 may be directly coupled to the CPU 330 via the SRAM buses 390 and 391. The SRAM buses 390 and 391 may provide a transmission interface between the arbiter circuit 370-1 and the CPU 330.

When the CPU 330 has to use or read the data stored in the memory device 320, such as the program codes, the CPU 330 may issue a read request or a read request command via a command interface (not shown) coupled to the interface logic circuit 350. In response to the request, the interface logic circuit 350 is configured to read the program codes required by the CPU 330 from the memory device 320, and transmit the data to the arbiter circuit 370-1 via the standard bus 360 as the transmission path 1 shown in FIG. 3. The arbiter circuit 370-1 is configured to transfer the program codes directly to the CPU 330 via the SRAM bus 390, so as to write the data to the internal memory device ICCM 331-1 or 331-2.

When the interface logic circuit 350 has to read the data stored in the internal memory device ICCM 331-1 or 331-2, the interface logic circuit 350 is configured to issue a read request or a read request command to the arbiter circuit 370-1. In response to the request or command, the arbiter circuit 370-1 is configured to directly read the data via the SRAM bus 391 and transfer the data to the interface logic circuit 350 via the standard bus 360.

For example, the interface logic circuit 350 may comprise an ECC engine 351. When the ECC engine 351 detects that some error has occurred in the data read from the memory device 320, the arbiter circuit 370-1 is configured to directly receive the erroneous program codes or data read from the internal memory device ICCM 331-1 or 331-2 via the SRAM bus 391, and transfer the data to the interface logic circuit 350 for error correction via the standard bus 360, as the transmission path 2 shown in FIG. 3. The corrected program codes or data may be transferred back to the arbiter circuit 370-1 via the standard bus 360 as the transmission path 1 shown in FIG. 3. The arbiter circuit 370-1 may then directly transfer the data to the CPU 330 via the SRAM bus 390, so as to write the data to the internal memory device ICCM 331-1 or 331-2 of the CPU 330.

According to an embodiment of the invention, the CPU 330 may comprise a plurality of multiplexers, such as the multiplexers 335, 336, 337 and 338 shown in FIG. 3. The multiplexers 335 and 336 may be configured to select the source of the data to be written into the internal memory device, and the multiplexers 337 and 338 may be configured to select the source of the data to be read out from the internal memory device.

The multiplexers 335 and 336 may comprise a plurality of input terminals, wherein one input terminal may be coupled to an internal bus of the CPU 330, and another input terminal may be directly coupled to an output port of the arbiter circuit 370-1 via the SRAM bus 390. The output terminal of the multiplexer 335 may be coupled to the internal memory device ICCM 331-1. The output terminal of the multiplexer 336 may be coupled to the internal memory device ICCM 331-2. The multiplexers 335 and 336 are respectively configured to multiplex the data received from the internal bus of the CPU or the SRAM bus 390 in response to a selection signal.

The multiplexers 337 and 338 may comprise a plurality of input terminals, wherein one input terminal may be coupled to the internal memory device ICCM 331-1, and another input terminal may be coupled to the internal memory device ICCM 331-2. The output terminal of the multiplexer 337 may be directly coupled to an input port of the arbiter circuit 370-1 via the SRAM bus 391. The output terminal of the multiplexer 338 may be directly coupled to an internal bus of the CPU 330. The multiplexers 337 and 338 are respectively configured to multiplex the data received from the internal memory device ICCM 331-1 or 331-2 in response to a selection signal.

According to an embodiment of the invention, the CPU 330 may further comprise logic circuits 333-1, 333-2, 333-4 and 333-4. The logic circuits 333-1 and 333-2 may respectively generate a selection signal according to a flag indicating whether the write operation is performed by an external device (that is, the device other than the CPU 330) and the memory address to be written. For example, when the flag indicating that the write operation is performed by an external device is set, and the memory address to be accessed is located in the range of the memory address of the internal memory device ICCM 331-1, the value of the selection signal output by the logic circuit 333-1 may be 1, for indicating that the source of the write operation is selected as the external device, such as the SRAM bus 390 and the arbiter circuit 370-1, so as to make the external device have the right to write the internal memory device ICCM 331-1. On the other hand, the value of the selection signal output by the logic circuit 333-2 may be 0, for selecting the source of the write operation as the internal bus of the CPU 330, making the internal device have the right to write the internal memory device ICCM 331-2. According to an embodiment of the invention, information regarding the flag indicating whether the write operation is performed by an external device and the memory address to be accessed may be stored in a register of the CPU 330 or the external device.

The logic circuits 333-3 and 333-4 may respectively generate a selection signal according to a flag indicating whether the read operation is performed by an external device (that is, the device other than the CPU 330) and the memory address to be read. For example, when the device intends to read data from the internal memory device of the CPU is an external device, and the memory address to be accessed is located in the range of the memory address of the internal memory device ICCM 331-1, the value of the selection signal output by the logic circuit 333-3 may be 0, for selecting the internal memory device ICCM 331-1 as the source of the read operation and making the external device to be able to read the data from the internal memory device ICCM 331-1. For another example, when the device intends to read data from the internal memory device of the CPU is an internal device of the CPU 330, and the memory address to be accessed is located in the range of the memory address of the internal memory device ICCM 331-2, the value of the selection signal output by the logic circuit 333-4 may be 1, for selecting the internal memory device ICCM 331-2 as the source of the read operation and making the internal device to be able to read the data from the internal memory device ICCM 331-2. According to an embodiment of the invention, information regarding the flag indicating whether the read operation is performed by an external device and the memory address to be accessed may be stored in a register of the CPU 330 or the external device.

Note that although in the embodiments as discussed above, the selection signal of the multiplexer is a one-bit signal, the invention should not be limited thereto. As will be readily appreciated by those who are skilled in the art, the multiplexers 335, 336, 337 and 338 may be extended as comprising two or more input terminals, and the corresponding selection signal may be a multi-bit signal.

According to an embodiment of the invention, a width of a data word of the internal memory device, such as the internal memory devices ICCM 331-1 and 331-2, of the CPU 330 may be set to be equal to a width of a data word of the standard bus 360. In addition, a width of a data word of the SRAM buses 390 and 391 may be set to be equal to a width of a data word of the standard bus 360. In this manner, there is no need to perform the data word width conversion on the data, and the data may be directly written into the internal memory device of the CPU 330. For example, suppose that a width of a data word of the standard bus 360 is set to X bytes, a width of a data word of the internal memory devices of the CPU 330 and a width of a data word of the SRAM buses 390 and 391 may also be set to X bytes, and a depth of the data stored in the internal memory devices of the CPU 330 may be set as (M/X) storage units, where M is the memory size of the internal memory devices of the CPU 330, and the data word width X means that X bytes of data will be accessed in each access operation. In addition, the arbiter circuit 370-1 coupled to the standard bus 360 and the SRAM bus may perform the data conversion between the standard bus interface protocol and the SRAM bus protocol.

In addition, according to an embodiment of the invention, besides setting the width of a data word of the internal memory device of the CPU 330 and the SRAM bus, the width of a data word of the circuits controlling the SRAM buses 390 and 391 and the memory address coding/decoding scheme may also be corresponding set according to the width of a data word of the standard bus 360.

Note that in order to clarify the concept of the invention, FIG. 3 presents a simplified block diagram, in which only the elements relevant to the invention are shown. However, note that the invention should not be limited what is shown in FIG. 3. For example, the memory controller may further comprise other master device not shown in FIG. 3.

Figure 4:
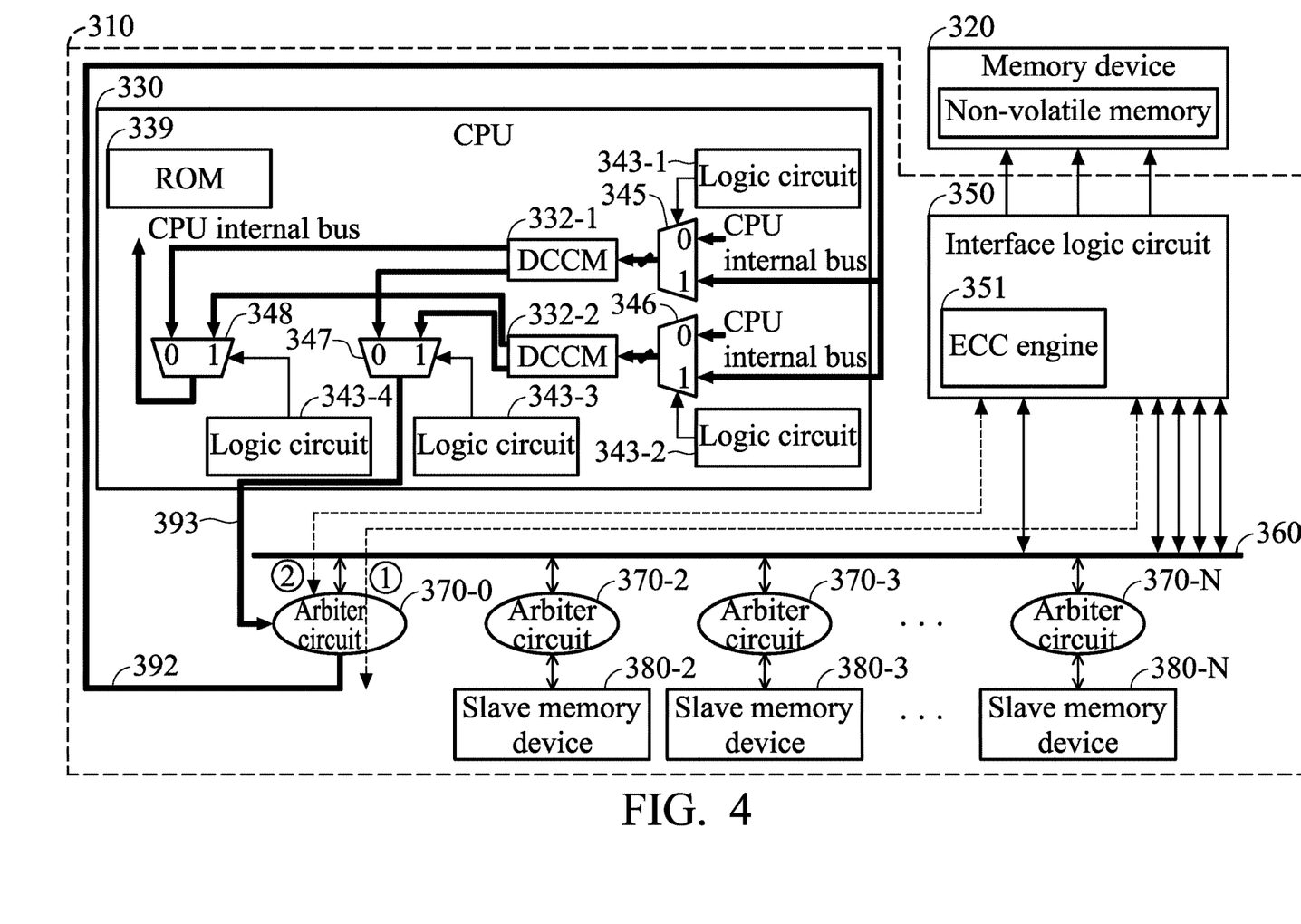
FIG. 4 is an exemplary block diagram of a memory controller according to another embodiment of the invention.

FIG. 4 is an exemplary block diagram of a memory controller according to another embodiment of the invention. The structure shown in FIG. 4 is similar to FIG. 3, and the difference is in that in FIG. 4, the internal memory devices DCCM 332-1 and 332-2 configured to store data in the CPU 330 is shown. Therefore, details of the same elements will be omitted here for the sake of brevity, as reference may be made to the prior descriptions of FIG. 3. Note that in an embodiment of the invention, the elements shown in FIG. 3 and FIG. 4 may be integrated into the same memory controller.

In the structure shown in FIG. 4, the CPU 330 does not comprise the DMA device. According to an embodiment of the invention, the arbiter circuit 370-0 may be directly coupled to the CPU 330 via the SRAM buses 392 and 393. The SRAM buses 392 and 393 may provide a transmission interface between the arbiter circuit 370-0 and the CPU 330.

When the CPU 330 has to use or read the data stored in the memory device 320, the CPU 330 may issue a read request or a read request command via a command interface (not shown) coupled to the interface logic circuit 350. In response to the request, the interface logic circuit 350 is configured to read the data required by the CPU 330 from the memory device 320, and transmit the data to the arbiter circuit 370-0 via the standard bus 360 as the transmission path 1 shown in FIG. 4. The arbiter circuit 370-0 is configured to transfer the data directly to the CPU 330 via the SRAM bus 392, so as to write the data to the internal memory device DCCM 332-1 or 332-2.

When the interface logic circuit 350 has to read the data stored in the internal memory device DCCM 332-1 or 332-2, the interface logic circuit 350 is configured to issue a read request or a read request command to the arbiter circuit 370-0. In response to the request or command, the arbiter circuit 370-0 is configured to directly read the data via the SRAM bus 393 and transfer the data to the interface logic circuit 350 via the standard bus 360.

For example, when the ECC engine 351 detects that some error has occurred in the data read from the memory device 320, the arbiter circuit 370-0 is configured to directly receive the erroneous data read from the internal memory device DCCM 332-1 or 332-2 via the SRAM bus 393, and transfer the data to the interface logic circuit 350 for error correction via the standard bus 360 as the transmission path 2 shown in FIG. 4. The corrected data may be transferred back to the arbiter circuit 370-0 via the standard bus 360 as the transmission path 1 shown in FIG. 4. The arbiter circuit 370-0 may directly transfer the data to the CPU 330 via the SRAM bus 392, so as to write the data to the internal memory device DCCM 332-1 or 332-2 of the CPU 330.

According to an embodiment of the invention, the CPU 330 may comprise a plurality of multiplexers, such as the multiplexers 345, 346, 347 and 348 shown in FIG. 4. The multiplexers 345 and 346 may be configured to select the source of the data to be written into the internal memory device, and the multiplexers 347 and 348 may be configured to select the source of the data to be read out from the internal memory device.

The multiplexers 345 and 346 may comprise a plurality of input terminals, wherein one input terminal may be coupled to an internal bus of the CPU 330, and another input terminal may be directly coupled to an output port of the arbiter circuit 370-0 via the SRAM bus 392. The output terminal of the multiplexer 345 may be coupled to the internal memory device DCCM 332-1. The output terminal of the multiplexer 346 may be coupled to the internal memory device DCCM 332-2. The multiplexers 345 and 346 are respectively configured to multiplex the data received from the internal bus of the CPU or the SRAM bus 392 in response to a selection signal.

The multiplexers 347 and 348 may comprise a plurality of input terminals, wherein one input terminal may be coupled to the internal memory device DCCM 332-1, and another input terminal may be coupled to the internal memory device DCCM 332-2. The output terminal of the multiplexer 347 may be directly coupled to an input port of the arbiter circuit 370-0 via the SRAM bus 393. The output terminal of the multiplexer 348 may be directly coupled to an internal bus of the CPU 330. The multiplexers 347 and 348 are respectively configured to multiplex the data received from the internal memory device DCCM 332-1 or 332-2 in response to a selection signal.

According to an embodiment of the invention, the CPU 330 may further comprise logic circuits 343-1, 343-2, 343-4 and 343-4. The logic circuits 343-1 and 343-2 may respectively generate a selection signal according to a flag indicating whether the write operation is performed by an external device (that is, the device other than the CPU 330) and the memory address to be written. For example, when the flag indicating that the write operation is performed by an external device is set, and the memory address to be accessed is located in the range of the memory address of the internal memory device DCCM 332-1, the value of the selection signal output by the logic circuit 343-1 may be 1, for indicating that the source of the write operation is selected as the external device, such as the SRAM bus 392 and the arbiter circuit 370-0, so as to make the external device have the right to write the internal memory device DCCM 332-1. On the other hand, the value of the selection signal output by the logic circuit 343-2 may be 0, for selecting the source of the write operation as the internal bus of the CPU 330, making the internal device have the right to write the internal memory device DCCM 332-2. According to an embodiment of the invention, information regarding the flag indicating whether the write operation is performed by an external device and the memory address to be accessed may be stored in a register of the CPU 330 or the external device.

The logic circuits 343-3 and 343-4 may respectively generate a selection signal according to a flag indicating whether the read operation is performed by an external device (that is, the device other than the CPU 330) and the memory address to be read. For example, when the device intends to read data from the internal memory device of the CPU is an external device, and the memory address to be accessed is located in the range of the memory address of the internal memory device DCCM 332-1, the value of the selection signal output by the logic circuit 343-3 may be 0, for selecting the internal memory device DCCM 332-1 as the source of the read operation and making the external device to be able to read the data from the internal memory device DCCM 332-1. For another example, when the device intends to read data from the internal memory device of the CPU is an internal device of the CPU 330, and the memory address to be accessed is located in the range of the memory address of the internal memory device DCCM 332-2, the value of the selection signal output by the logic circuit 343-4 may be 1, for selecting the internal memory device DCCM 332-2 as the source of the read operation and making the internal device to be able to read the data from the internal memory device DCCM 332-2. According to an embodiment of the invention, information regarding the flag indicating whether the read operation is performed by an external device and the memory address to be accessed may be stored in a register of the CPU 330 or the external device.

Note that although in the embodiments as discussed above, the selection signal of the multiplexer is a one-bit signal, the invention should not be limited thereto. As will be readily appreciated by those who are skilled in the art, the multiplexers 345, 346, 347 and 348 may be extended as comprising two or more input terminals, and the corresponding selection signal may be a multi-bit signal.

According to an embodiment of the invention, a width of a data word of the internal memory device, such as the internal memory devices DCCM 332-1 and 332-2, of the CPU 330 may be set to be equal to a width of a data word of the standard bus 360. In addition, a width of a data word of the SRAM buses 392 and 393 may be set to be equal to a width of a data word of the standard bus 360. In this manner, there is no need to perform the data word width conversion on the data, and the data may be directly written into the internal memory device of the CPU 330. For example, suppose that a width of a data word of the standard bus 360 is set to X bytes, a width of a data word of the internal memory devices of the CPU 330 and a width of a data word of the SRAM buses 392 and 393 may also be set to X bytes, and a depth of the data stored in the internal memory devices of the CPU 330 may be set as (M/X) storage units, where M is the memory size of the internal memory devices of the CPU 330, and the data word width X means that X bytes of data will be accessed in each access operation. In addition, the arbiter circuit 370-0 coupled to the standard bus 360 and the SRAM bus may perform the data conversion between the standard bus interface protocol and the SRAM bus protocol.

In addition, according to an embodiment of the invention, besides setting the width of a data word of the internal memory device of the CPU 330 and the SRAM bus, the width of a data word of the circuits controlling the SRAM buses 392 and 393 and the memory address coding/decoding scheme may also be corresponding set according to the width of a data word of the standard bus 360.

Note that in order to clarify the concept of the invention, FIG. 4 presents a simplified block diagram, in which only the elements relevant to the invention are shown. However, note that the invention should not be limited what is shown in FIG. 4. For example, the memory controller may further comprise other master device not shown in FIG. 4.

As discussed above, compared to the structure shown in FIG. 2, in the structures shown in FIG. 3 and FIG. 4, at least one slave memory device and the DMA device are eliminated. In this manner, not only the circuit area can be saved, but also the time required for data access can be saved because the operation of moving the data to the slave memory device can be skipped. Therefore, the system performance can be greatly improved. In addition, because the structure of FIG. 3 and FIG. 4 is a simpler structure than the one shown in FIG. 2, the complexity of the circuit can be reduced, and the hardware cost can also be reduced.

The term "coupled" in the description of the invention generally refers to various direct or indirect electrical connections. While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A memory controller, coupled to an external memory device and configured to control operations thereof, comprising:
   a central processing unit, comprising an internal memory device;
   an interface logic circuit, coupled to the external memory device and a first bus; and
   an arbiter circuit, coupled to the first bus and the central processing unit, wherein the arbiter circuit is directly coupled to the central processing unit via a second bus, and
   wherein in response to a first request to read predetermined data stored in the external memory device, the interface logic circuit is configured to read the predetermined data from the external memory device and transmit the predetermined data to the arbiter circuit via the first bus, and the arbiter circuit is configured to transfer the predetermined data directly to the central processing unit via the second bus to write the predetermined data to the internal memory device, and the predetermined data is sequentially passed from the external memory device to the interface logic circuit, then to the arbiter circuit and the central processing unit.

2. The memory controller as claimed in claim 1, wherein in response to a second request to read the predetermined data stored in the internal memory device, the arbiter circuit is configured to directly read the predetermined data via the second bus and transfer the predetermined data to the interface logic circuit via the first bus.

3. The memory controller as claimed in claim 1, wherein the first bus is a standard bus and the second bus is a static random access memory (SRAM) bus.

4. The memory controller as claimed in claim 1, wherein the central processing unit further comprises:
   a multiplexer, coupled to the internal memory device, an internal bus and the second bus, and configured to multiplex the data received from the internal bus or the second bus in response to a selection signal.

5. The memory controller as claimed in claim 4, wherein the arbiter circuit is directly coupled to an input terminal of the multiplexer via the second bus.

6. The memory controller as claimed in claim 1, wherein a width of a data word of the internal memory device is set to be equal to a width of a data word of the first bus.

7. The memory controller as claimed in claim 1, wherein a width of a data word of the second bus is set to be equal to a width of a data word of the first bus.

8. A data storage device, comprising:
   a non-volatile memory device; and
   a memory controller, coupled to the non-volatile memory device, configured to control operations of the non-volatile memory device, and comprising:
   a central processing unit, comprising an internal memory device;
   an interface logic circuit, coupled to the non-volatile memory device and a first bus; and an arbiter circuit, coupled to the first bus and the central processing unit, wherein the arbiter circuit is directly coupled to the central processing unit via a second bus, and wherein the central processing unit issues a first request to the interface logic circuit to read predetermined data stored in the non-volatile memory device, and in response to the first request, the interface logic circuit is configured to read the predetermined data from the non-volatile memory device and transmit the predetermined data to the arbiter circuit via the first bus, and the arbiter circuit is configured to transfer the predetermined data directly to the central processing unit via the second bus to write the predetermined data to the internal memory device, and the predetermined data is sequentially passed from the non-volatile memory device to the interface logic circuit, then to the arbiter circuit and the central processing unit.

9. The data storage device as claimed in claim 8, wherein the interface logic circuit issues a second request to the arbiter circuit to read the predetermined data stored in the internal memory device, and in response to the second request, the arbiter circuit is configured to directly read the predetermined data via the second bus and transfer the predetermined data to the interface logic circuit via the first bus.

10. The data storage device as claimed in claim 8, wherein the first bus is a standard bus and the second bus is a static random access memory (SRAM) bus.

11. The data storage device as claimed in claim 8, wherein the central processing unit further comprises:
   a multiplexer, coupled to the internal memory device, an internal bus and the second bus, and configured to multiplex the data received from the internal bus or the second bus in response to a selection signal.

12. The data storage device as claimed in claim 11, wherein the arbiter circuit is directly coupled to an input terminal of the multiplexer via the second bus.

13. The data storage device as claimed in claim 8, wherein a width of a data word of the internal memory device is set to be equal to a width of a data word of the first bus.

14. The data storage device as claimed in claim 8, wherein a width of a data word of the second bus is set to be equal to a width of a data word of the first bus.

* * * * *